United States Patent

[11] 3,578,831

[72] Inventor Hudson B. Scheifele
30165 Ponds View Road, Franklin, Mich. 48025
[21] Appl. No. 798,931
[22] Filed Feb. 13, 1969
Division of Ser. No. 685,525, Nov. 24, 1967, abandoned. Filed Feb. 13, 1969, Ser. No. 798,931
[45] Patented May 18, 1971

[54] COMPOSITE TAPERED ROLLER BEARING AND METHOD OF MAKING THE SAME
3 Claims, 3 Drawing Figs.
[52] U.S. Cl. .................................................. 308/214
[51] Int. Cl. .................................................. F16c 33/34
[50] Field of Search ........................................ 300/212, 213, 214

[56] References Cited
UNITED STATES PATENTS
1,188,712  6/1916  Avrunin .................... 308/214
3,258,576  6/1966  Schleich et al. .......... 219/122
3,384,308  5/1968  Cupler ....................... 219/121EB
3,447,849  6/1969  Harris et al. .............. 308/214

FOREIGN PATENTS
990,551  4/1965  Great Britain ............. 308/214
971,246  6/1950  France ....................... 308/213

OTHER REFERENCES
Electron Beam Welding Process operates in a vacuum published in Iron Age March 26, 1959, page 156 thru 158 relied upon copy in 219EB Primary Examiner—Frederick L. Matteson
Assistant Examiner—Frank Susko
Attorney—Barthel & Bugbee ABSTRACT: This composite tapered roller bearing has outer and inner races, each of which is built up by a method which includes forming annular inner and outer tapered or frustoconical load-bearing roller path members formed from unheat-treated butt-welded strips of steel, subsequently heat-treating and final grinding these annular members, welding to the large end of the annular inner roller path member a finished side ring, forming an annular roller retainer with circumferentially spaced pocket openings, assembling a complement of tapered rollers in these circumferentially spaced pocket openings of this annular roller retainer, these tapered rollers having spherical surfaces on their larger diameter ends, placing the thus-formed assembly on the thus partially built-up inner race, and welding a smaller side ring to the other end of the annular inner roller path member.

These tapered rollers engage a tapered or frustoconical annular inner load-bearing surface on the annular central roller path member of this composite tapered roller bearing inner race, the larger diameter side ring of which has an annular inner surface of spherical curvature mating with the spherically curved surfaces on the larger ends of the tapered rollers. Before welding, the inner roller path member and the side rings are preferably case hardened in the areas actually engaged by the side and end surfaces respectively of the rollers, the remaining area of each ring not so engaged being selectively excluded from the case hardening. This enables the bearing components to be case hardened and precision ground and honed before assembling and welding, preferably by electronic or laser welding to precisely localize the welds.

PATENTED MAY 18 1971 3,578,831

INVENTOR
HUDSON B. SCHEIFELE

BY Barthel & Bugbee

ATTORNEYS

COMPOSITE TAPERED ROLLER BEARING AND METHOD OF MAKING THE SAME

This is a divisional application of my copending application Ser. No. 685,525 filed Nov. 24, 1967 for Composite Roller Bearing and Method of Making the Same, now abandoned.

Prior Art Background of the Invention

In the prior art, inner roller bearing races have sidewalls which are separated from the actual roller path by annular grooves. These grooves have been deemed necessary in order to enable overhang of the opposite edges of the grinding wheel during grinding, but such grooves reduce the width of the roller path, cause roller overhang, and structurally weaken the race and shorten the working life of the bearing by the high concentration of stresses resulting therefrom. Such one-piece outer and inner races from tubular stock possess transverse fiber orientation with increased fatigue and consequently reduced working life. Case hardening of such a one-piece outer or inner race necessarily applies the same thickness of case layer to the sidewalls as to the roller path, with consequent embrittlement of the narrow sidewalls where the load conditions do not require the same heavy thickness of case hardening to be applied to the sidewalls as to the roller path.

In prior tapered roller bearings, the large sidewall surface at the large end of the inner race that contacts the larger diameter ends of the tapered rollers does not match the surfaces on the larger diameter ends of the tapered rollers. Consequently, during operation under heavy loads the large sidewall surface of the inner race wears away due to friction until such matching of these surfaces occurs. This wearing-in process produces high torque in the bearing and generates heat that must be dissipated by means of excessive lubrication until these two rubbing surfaces are matched. This wearing-in process results in a loss of preload adjustment in the setup of these prior bearings.

The "cage" in conventional tapered roller bearings is closed in at the last operation of assembling the inner race, cage and rollers. This operation prevents the assembly from coming apart and determines the clearance between the roller diameter and the cage pocket width opening. Since this closing-in process of the cage involves a large number of variables, it restricts the maintenance of a close clearance between roller and cage pocket by a fixed repeatable assembly procedure.

Advantages of the Invention

The construction of the tapered rollers and inner race of the present invention maintains each roller in proper alignment by providing an increased width of contact between the spherically curved larger diameter ends of the tapered rollers and the spherically curved mating sidewall surface of the inner race and maintains a controlled close clearance between the roller diameter and the cage pocket width. This prevents skewing of the rollers during operation. It also reduces friction by providing improved additional bearing engagement between the spherical larger end of each bearing roller and its spherically curved adjacent side ring, with a film of lubricant maintained therebetween. It also maintains a predetermined preloading of the bearing and prevents the loss thereof resulting from the subsequent wear, during operation, of ordinary tapered roller bearings wherein the rollers tend to skew, generate excessive friction and undergo excessive wear as the result thereof. Moreover, the composite tapered roller bearing of this invention overcomes the prior art disadvantages and defects by providing the previously case-hardened welded inner composite races. The roller path member can thus be provided with a heavier case-hardened layer than the side rings in order to sustain its greater loads while the thinner case-hardened layers on the side rings render them less brittle and consequently stronger and more resistant to impact loads. This construction avoids roller end overhang and increases the structural strength because of the elimination of the prior art end grooves in the outer and inner races and the consequently eliminated stress concentration and the enhanced width of roller path provided throughout the entire length of each roller. By thus butt welding a suitably formed strip of steel into an annular roller path member, the longitudinal fiber orientation of the strip becomes circumferential in the annular member. This results in consequently greatly reduced fatigue, in contrast to the greatly increased fatigue occurring in conventional annular roller path members made from tubular stock wherein the fiber orientation is transverse or paraxial, i.e. parallel to the axis.

The roller path member and the inner surfaces of the side rings are individually processed and the roller path can be honed to high precision. By the use of the punched roller retainer or cage, the maximum complement of rollers is obtained without sacrificing retainer strength. Such a case, when formed either of butt-welded punched strip stock or drawing flat stock, is easier to control as regards dimensional accuracy than a cage that has to be closed in at assembly, and consequently produces lower unbalanced forces and vibration and better control of the rollers. The composite tapered roller bearing thus provided possesses greater strength and load characteristics for its weight and bulk than prior art roller bearings. This composite tapered roller bearing for the foregoing reasons is produced at lower cost and consequently can be sold at a lower price to the user.

Figure 1:
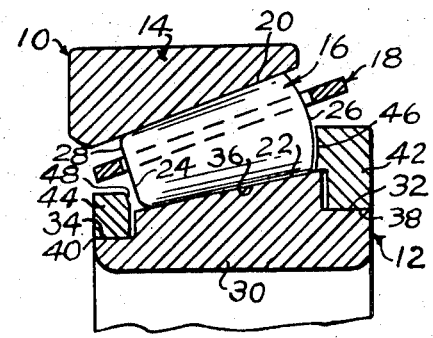
FIG. 1 is a fragmentary longitudinal section through a tapered roller bearing with a built-up welded inner race having a seat of arcuate cross section on the thrust flange thereof, according to the invention, and with tapered frustoconical rollers.

The composite tapered roller bearing, generally designated 10, shown in FIG. 1 embodies the principles of the present invention by employing a composite welded inner race 12, an annular outer race 14, and frustoconical rollers 16 within an annular frustoconical roller retainer or cage 18. The outer race 14 has a frustoconical roller path surface 20 against which the frustoconical surfaces 22 of the rollers 16 roll. Each roller 16 has a generally flat smaller end surface 24 and a preferably spherical convex larger end surface 26 having its center of curvature disposed at the apex of the cone including the surface 22 and thus disposed substantially at the apex of the conical roller path surface 20 of the inner race 12. The retainer or cage 18 is of frustoconical shape with circumferentially spaced trapezoidal openings or "pockets" 28 for receiving the rollers 16, with small clearances.

The composite inner race 12 is built up of a central annular roller path member 30 having rabbet grooves 32 and 34 at its opposite ends with a case-hardened frustoconical roller path surface 36 extending therebetween. Welded as at 38 and 40 into the rabbet grooves 32 and 34 by electron welding or laser welding are large and small side rings 42 and 44 respectively. The side rings 42 and 44 are of annular shape but the side ring 42 has an annular spherical concave inner surface 46 which extends into mating engagement with the spherical large end surface 26 of each roller 16 and is of substantially the same curvature. The inner corner edge of the smaller side ring 44 is beveled as at 48.

Figure 2:
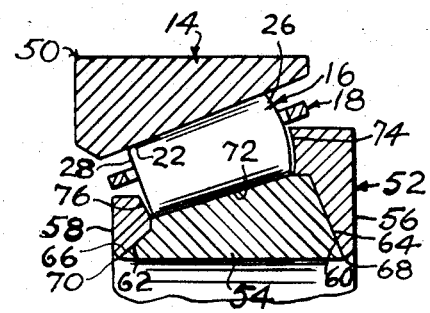
FIG. 2 is a fragmentary longitudinal section through a tapered roller bearing with a modified built-up inner race or "cone"
Figure 3:
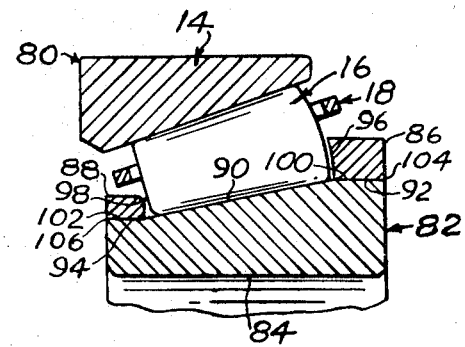
FIG. 3 is a fragmentary longitudinal section through a tapered roller bearing with a further modified built-up inner race or "cone."

The first and second modified tapered roller bearings, generally designated 50 and 80 respectively and shown in FIGS. 2 and 3, also employ the same solid outer race 14, rollers 16 and roller retainer or cage 18 as in the tapered roller bearing 10 of FIG. 1. Accordingly, these parts are designated with the same reference numerals, but they are used with first and second modified composite inner races, generally designated 52 and 82 respectively.

The first modified composite tapered roller bearing inner race, generally designated 52, shown in FIG. 2, consists of an annular central roller path member 54 and large and small side rings 56 and 58 respectively. The annular roller path member 54 has approximately V-sahped large and small end surfaces 60 and 62 of convex and concave configuration respectively interfitting with annular oppositely configured surfaces 64 and 66 of correspondingly V-shaped configuration and annularly concave and convex respectively. Electronic welding or laser welding is carried out at the interfaces 68 and 70 respectively after the load-bearing tapered surface 72 and the opposite curved and beveled surfaces 74 and 76 respectively have been provided with case-hardened layers.

The second modified composite tapered roller bearing inner race, generally designated 82, shown in FIG. 3 consists of an annular central roller path member 84 and large and small side rings 86 and 88. The central member 84 has a case-hardened frustoconical load-bearing path surface 90 on its outer periphery flanged by external cylindrical end surfaces 92 and 94 at the large and small ends thereof respectively. The side rings 86 and 88 are provided with case-hardened curved and beveled inner surfaces 96 and 98 respectively with internal cylindrical surfaces 100 and 102 respectively fitting the external cylindrical surfaces 92 and 94 respectively. Electronic or laser welding is carried out at the junctions 104 and 106 respectively.

The tapered roller bearing 10 of FIG. 1 is assembled by first partially fabricating the composite inner race. The finished side ring 42 of FIG. 1 or the side rings 56 or 86 of FIGS. 2 or 3 respectively are moved into place against the surface to which they are to be welded on the finished central load-bearing inner roller path member 30, 54 or 84 and electronic or laser welding carried out to unite these corresponding mating parts. A full complement of rollers 16 are assembled in the pockets 28 of the roller retainer or cage 18 and the partially fabricated composite inner race is then moved into the interior of this cage and roller assembly with the rollers 16 engaging the partial composite inner race surfaces 36 and 46 respectively. The side rings 44 of FIG. 1 or the side rings 58 or 88 of FIGS. 2 and 3 respectively are then moved into place against the surfaces to which they are to be welded on the central load-bearing inner roller path member 30, 54 or 84 and electronic or laser welding carried out to unite these corresponding mating parts. The particular tapered roller bearing 10, 50 or 80 is then complete and the rollers 16 thereof will not fall out since they are held in position by the respective side rings 42, 44 or 56, 58 or 86, 88 of the composite inner races 12, 52 or 82 respectively.

I claim:

1. A composite tapered roller bearing, comprising
   a tapered annular roller retainer having a multiplicity of circumferentially spaced roller pocket openings therethrough,
   a multiplicity of tapered frustoconical antifriction bearing rollers disposed one in each pocket opening,
   an annular outer bearing race having a tapered frustoconical internal roller path surface engaging said bearing rollers,
   and a composite annular inner bearing race having a central annular roller path member with a tapered frustoconical external roller path surface engaging said bearing rollers and having a pair of opposite side rings secured to said central roller path member in axially spaced relationship and projecting radially into proximity to the ends of said rollers,
   said roller path surfaces and the tapered surfaces of said rollers converging toward one another,
   said rollers having larger ends provided with convex spherical end surfaces thereon,
   the one of said side rings nearest said larger roller ends having a concave spherical side surface of the same curvature as said larger roller ends and matingly engageable therewith.

2. A composite tapered roller bearing, according to claim 1, wherein said roller path member of said inner race has annular side ring seats disposed on substantially the same levels as the adjacent ends of said external roller path surface.

3. A composite tapered roller bearing, according to claim 1, wherein said roller path member of said inner race as annular side surfaces diverging away from said external roller path surface, and wherein said side rings have correspondingly tapered inner surfaces mating with said diverging side surfaces of said roller path member.